US012567275B1

(12) United States Patent
Penfield et al.

(10) Patent No.: US 12,567,275 B1
(45) Date of Patent: Mar. 3, 2026

(54) COMPUTING SYSTEM AND METHOD FOR EXTRACTING UNSTRUCTURED DOCUMENT DATA

(71) Applicant: VelocityEHS Holdings Inc., Chicago, IL (US)

(72) Inventors: Julia Penfield, Seattle, WA (US); Aatish Suman, Singapore (SG)

(73) Assignee: Velocity EHS Holdings, Inc., Chicago, IL (US)

( * ) Notice: Subject to any disclaimer, the term of this patent is extended or adjusted under 35 U.S.C. 154(b) by 0 days.

(21) Appl. No.: 19/268,388

(22) Filed: Jul. 14, 2025

(51) Int. Cl.
| | |
|---|---|
| *G06K 9/00* | (2022.01) |
| *G06T 3/608* | (2024.01) |
| *G06T 7/11* | (2017.01) |
| *G06V 30/19* | (2022.01) |
| *G06V 30/414* | (2022.01) |

(52) U.S. Cl.
CPC ............ *G06V 30/414* (2022.01); *G06T 3/608* (2013.01); *G06T 7/11* (2017.01); *G06V 30/19093* (2022.01)

(58) Field of Classification Search
CPC ........... G06V 30/414; G06V 30/19093; G06V 30/10; G06V 30/41; G06V 30/412; G06V 30/418; G06T 3/608; G06T 7/11
See application file for complete search history.

(56) References Cited

U.S. PATENT DOCUMENTS

| | | | | |
|---|---|---|---|---|
| 5,884,014 | A * | 3/1999 | Huttenlocher | .......... G06T 11/00 |
| | | | | 358/1.15 |
| 6,665,841 | B1 * | 12/2003 | Mahoney | ............ G06F 16/5838 |
| | | | | 715/204 |
| 7,593,120 | B2 * | 9/2009 | Kitora | .................. G06V 30/414 |
| | | | | 358/1.9 |
| 8,571,317 | B2 * | 10/2013 | Welling | ............... G06V 30/262 |
| | | | | 382/173 |
| 9,171,202 | B2 * | 10/2015 | Hull | ..................... G06V 30/413 |
| 10,095,677 | B1 * | 10/2018 | Manohar | .............. G06V 30/412 |
| 11,790,681 | B2 * | 10/2023 | Desai | ...................... G06F 16/55 |
| | | | | 382/224 |
| 12,073,238 | B2 * | 8/2024 | Anderson | .............. G06Q 10/10 |
| 12,354,394 | B2 * | 7/2025 | Anzenberg | ......... G06V 30/1456 |
| 2006/0114484 | A1 * | 6/2006 | Kitora | ............... G06V 30/1448 |
| | | | | 358/1.13 |
| 2009/0313245 | A1 * | 12/2009 | Weyl | .................... G06V 30/414 |
| | | | | 707/999.005 |
| 2025/0209430 | A1 * | 6/2025 | Franklin | .............. G06Q 20/042 |

* cited by examiner

*Primary Examiner* — Shervin K Nakhjavan
(74) *Attorney, Agent, or Firm* — K&L Gates LLP

(57) ABSTRACT

A computing system and method are configured to receive an input in a portable document format, generate a raster image of the input, and detect a form type of the input based on the raster image. In response to detecting that the raster image of the input indicates a first form type, the computing system and method are configured to partition the raster image into sections corresponding to document regions containing document entities targeted for retrieval for a specific form type, generate sub-images based on bounding coordinates of the sections, and apply selected document data identification and retrieval computational techniques to extract the document entities from the sub-images.

18 Claims, 10 Drawing Sheets

*FIG. 6*

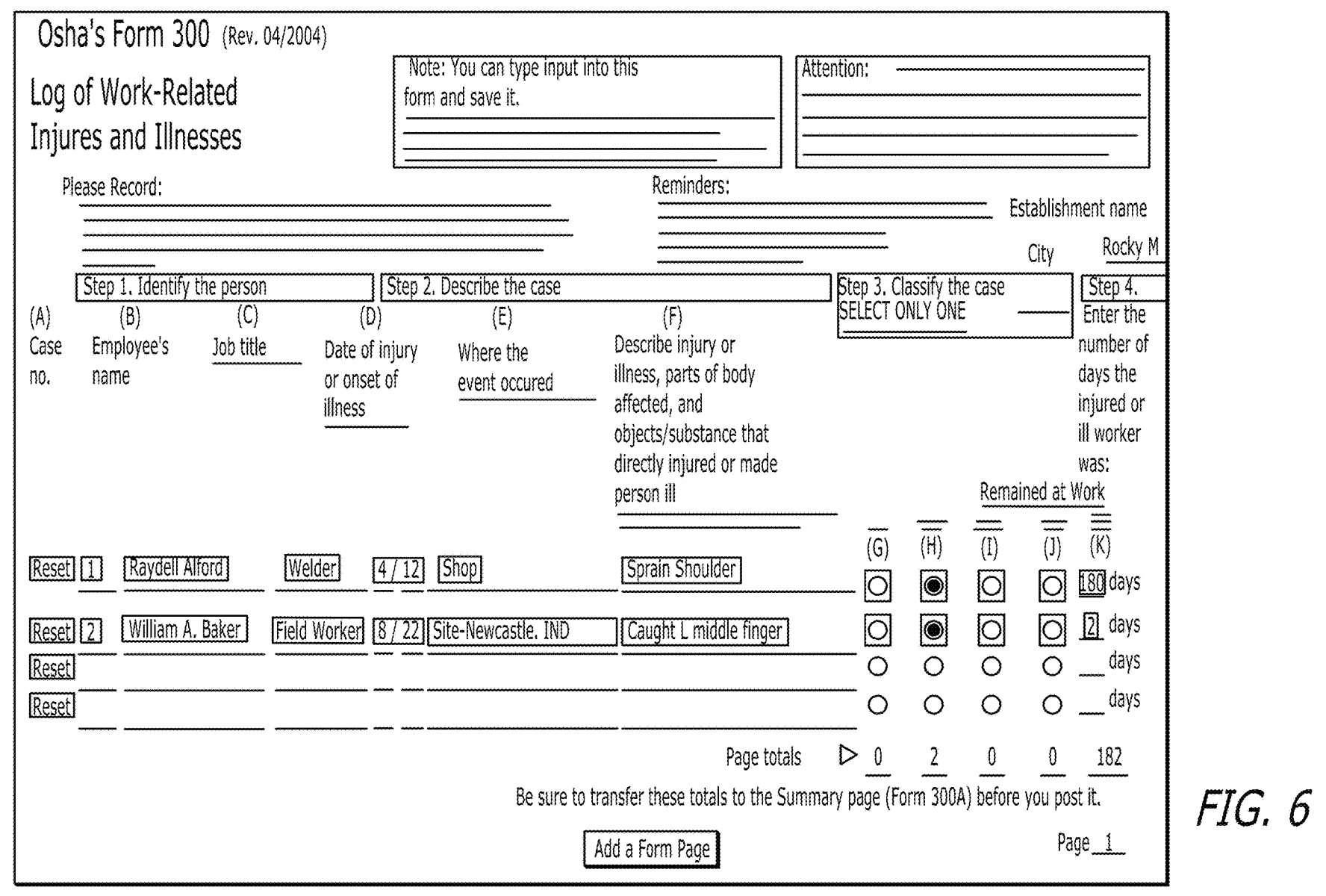

Osha's Form 300 (Rev. 04/2004)

Log of Work-Related
Injures and Illnesses

Please Record:

Note: You can type input into this
form and save it.

Attention:

Reminders:

Establishment name

City    Rocky M

Step 1. Identify the person (A) Case no.   (B) Employee's name   (C) Job title   (D) Date of injury or onset of illness Step 2. Describe the case (E) Where the event occured (F) Describe injury or illness, parts of body affected, and objects/substance that directly injured or made person ill Step 3. Classify the case
SELECT ONLY ONE Step 4. Enter the number of days the injured or ill worker was:

Remained at Work (G)   (H)   (I)   (J)   (K)

Reset [1]   Raydell Alford   Welder   4 / 12   Shop   Sprain Shoulder   (G) ◻   (H) ●   (I) ◻   (J) ◻   (K) 180 days Reset [2]   William A. Baker   Field Worker   8 / 22   Site-Newcastle, IND   Caught L middle finger   (G) ◻   (H) ●   (I) ◻   (J) ◻   (K) 2 days Reset Reset Page totals   △ 0   0   2   0   0   days   182

Be sure to transfer these totals to the Summary page (Form 300A) before you post it.

Add a Form Page

Page 1

Figure 7:
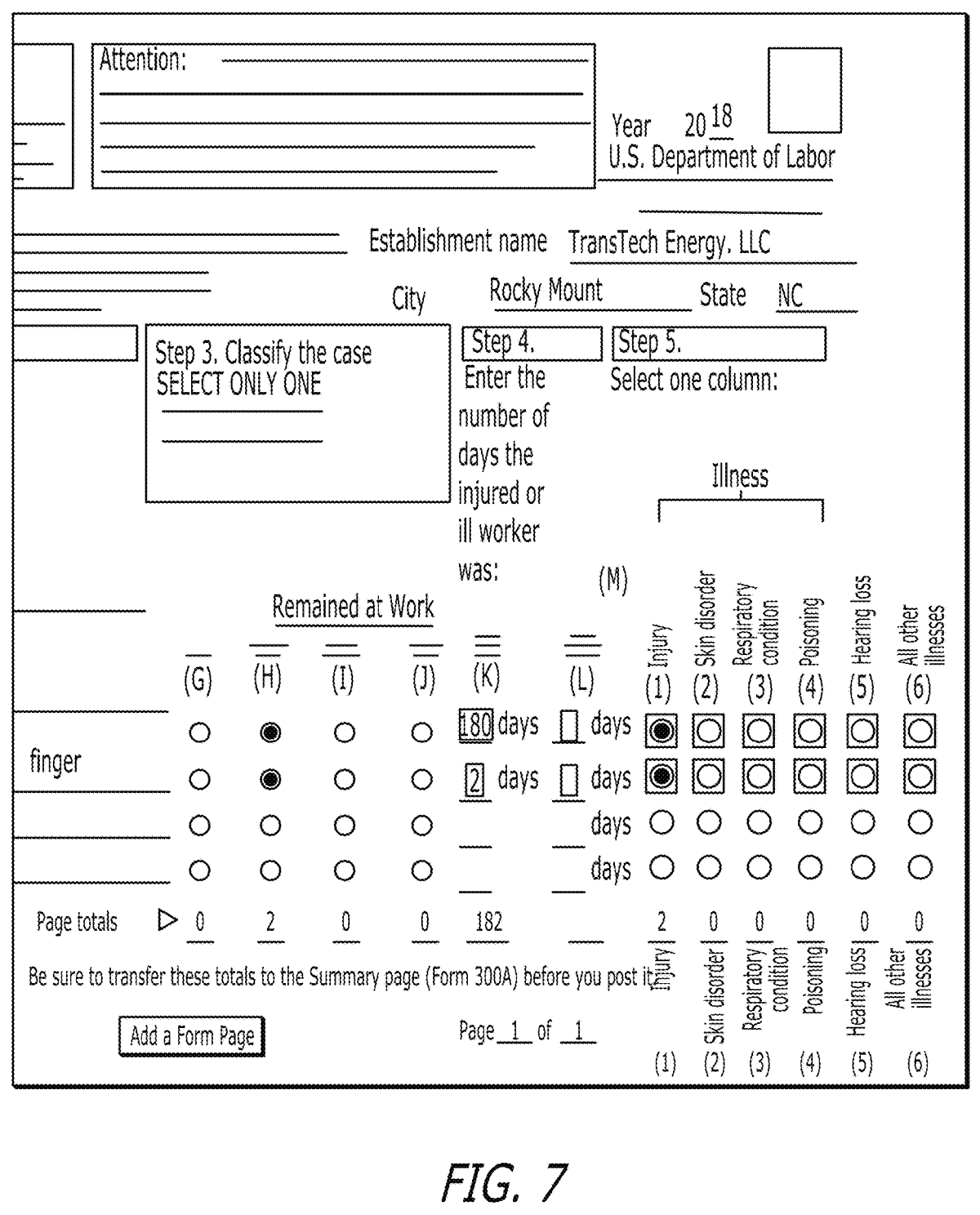

Attention: _____

Year 20 18
U.S. Department of Labor

Establishment name  TransTech Energy, LLC

City  Rocky Mount  State  NC

Step 3. Classify the case
SELECT ONLY ONE

Step 4.
Enter the number of days the injured or ill worker was:

Step 5.
Select one column:

Illness

Remained at Work

| | (G) | (H) | (I) | (J) | (K) | (L) | Injury (1) | Skin disorder (2) | Respiratory condition (3) | Poisoning (4) | Hearing loss (5) | All other illnesses (6) |
|---|---|---|---|---|---|---|---|---|---|---|---|---|
| finger | ○ | ● | ○ | ○ | 180 days | ☐ days | ● | ○ | ○ | ○ | ○ | ○ |
| | ○ | ● | ○ | ○ | 2 days | ☐ days | ● | ○ | ○ | ○ | ○ | ○ |
| | ○ | ○ | ○ | ○ | ___ days | ___ days | ○ | ○ | ○ | ○ | ○ | ○ |
| | ○ | ○ | ○ | ○ | ___ days | ___ days | ○ | ○ | ○ | ○ | ○ | ○ |
| Page totals ▷ | 0 | 2 | 0 | 0 | 182 | | 2 | 0 | 0 | 0 | 0 | 0 |

(M)

Be sure to transfer these totals to the Summary page (Form 300A) before you post it.

Injury (1)  Skin disorder (2)  Respiratory condition (3)  Poisoning (4)  Hearing loss (5)  All other illnesses (6)

Add a Form Page

Page 1 of 1

*FIG. 7* d Illnesses

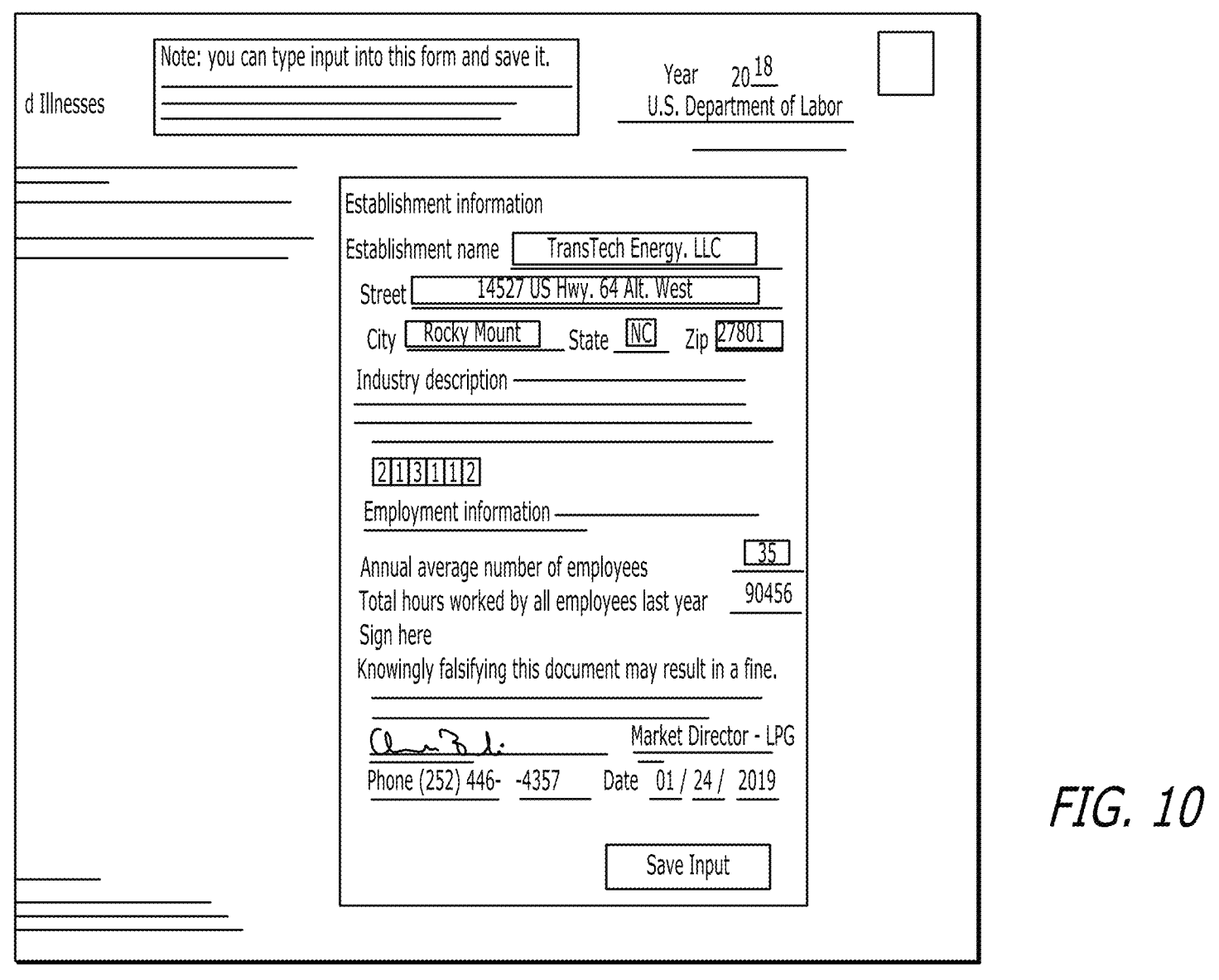

Note: you can type input into this form and save it.

Year 20 18
U.S. Department of Labor

Establishment information

Establishment name    TransTech Energy, LLC

Street    14527 US Hwy. 64 Alt. West

City    Rocky Mount    State    NC    Zip    27801

Industry description 2 1 1 3 1 1 2

Employment information

Annual average number of employees    35

Total hours worked by all employees last year    90456

Sign here

Knowingly falsifying this document may result in a fine.

Market Director - LPG

Phone (252) 446-    -4357    Date    01 / 24 / 2019

Save Input

FIG. 10

COMPUTING SYSTEM AND METHOD FOR EXTRACTING UNSTRUCTURED DOCUMENT DATA

FIELD OF TECHNOLOGY

The present disclosure generally relates to computing systems and methods for enabling configurable logic for targeted content extraction based at least upon document structure or learned patterns, and more particularly relates to an automated pipeline leveraging advanced computer vision and machine learning techniques to parse unstructured document data and convert extracted document data into a machine-readable format.

BACKGROUND

Occupational safety documentation represents a critical yet administratively burdensome aspect of modern workplace management. The Occupational Safety and Health Administration (OSHA) mandates that employers maintain detailed records of work-related injuries and illnesses through standardized forms, specifically OSHA 300 (Log of Work-Related Injuries and Illnesses) and OSHA 300A (Summary of Work-Related Injuries and Illnesses). While these records serve essential regulatory and safety management purposes, the manual processes typically employed to extract, analyze, and utilize this information create significant operational inefficiencies and missed opportunities for proactive safety interventions. Some research has indicated that safety professionals dedicate approximately 30% of their time to administrative documentation rather than prevention activities, while others found that manual data entry introduces transcription errors in 4-7% of cases, compromising data integrity and subsequent analysis. It has been reported that the lag between incident occurrence, recording, and analysis creates significant delays in identifying emerging safety trends, resulting in reactive rather than proactive safety management.

Accordingly, there is a need for a high-throughput computing system and method for applying advanced and high-accuracy computer vision and machine learning techniques to perform targeted document data extraction and convert the extracted document data into a machine-readable format.

SUMMARY

Among other features, the present disclosure relates to computing systems and methods (e.g., machine learning-based) for automated information extraction from standardized forms such as OSHA 300 and 300A forms. The disclosed computing system may be configured to extract the information from received forms with high accuracy (>95% on test dataset containing 3 k documents) while significantly reducing processing time compared to manual methods (~15× faster). The disclosed computing system offers applications across a wide range of Environmental, Health, Safety (EHS) and Environmental, Social, Governance (ESG) domains. In workers' compensation management, the disclosed computing system enables automatic correlation between OSHA recordable incidents and claims, enhancing cost tracking and return-to-work program efficacy. For insurance and risk management, the disclosed computing system facilitates automated generation of standardized loss histories and real-time injury data for Experience Modification Rate (EMR) projections. In contractor management, the disclosed computing system provides standardized analysis of safety performance across multiple organizations, while supporting ESG reporting through consistent calculation of safety metrics like Total Recordable Incident Rate (TRIR) and Days Away, Restricted, or Transferred (DART) rate. By automating information extraction from OSHA logs, organizations can accelerate insight generation, enhance data quality, and ultimately shift resources from documentation to prevention activities.

Among other features, in one aspect, the present disclosure relates to an example system deployed within a communication network, the system comprising: a computing device deployed within the communication network, comprising: a non-transitory computer-readable storage medium configured to store an application program; and a processor coupled to the non-transitory computer-readable storage medium and configured to control a plurality of modules to execute instructions of the application program to obtain an input in a portable document format (PDF) via a first user interface element of the application program. The system may further comprise a computing server system configured to: receive the input from the computing device via a first application programming interface (API) call, determine document entities to be identified and retrieved from the input in accordance with each of a plurality of form types, analyze each of the plurality of document entities to determine a plurality of document data identification and retrieval computational techniques, generate a raster image of the input in accordance with a selected dot per inch (DPI), detect a form type of the input based on the raster image of the input, in response to detecting that the raster image of the input indicates one of the plurality of form types, partition the raster image into a plurality of sections corresponding to document regions containing the document entities targeted for retrieval for the one of the plurality of form types, generate sub-images based on bounding coordinates of the plurality of sections, and apply one or more of the plurality of document data identification and retrieval computational techniques to extract the document entities from the sub-images, and save processing results of the plurality of document data identification and retrieval computational techniques in identifying and retrieval of each of the document entities in at least one database.

In some embodiments, the computing server system may be further configured to de-skew the raster image of the input to correct a rotation of the raster image.

In other embodiments, the computing server system may be further configured to: i) apply an optical character recognition technique to extract texts from a top left corner of the raster image; ii) compare the texts to a plurality of selected terms associated with the first and second form types; iii) upon detecting a match between the texts and at least one of the plurality of selected terms, identify a current orientation of the raster image as a proper orientation; iv) in response to detecting no match between the texts and at least one of the plurality of selected terms, perform a language detection of the texts and store a confidence score of the language detection; v) rotate the raster image by 90 degrees and repeat i), ii), iii) and iv) for 90 degrees, 180 degrees and 360 degrees; vi) select an orientation corresponding to a highest confidence score if no proper orientation of the input has been identified after v); and vii) rotate the raster image in connection with the orientation corresponding to the highest confidence score.

In additional embodiments, the computing server system may be configured to: extract, from the raster image, textual content represented by a list of tokens and coordinates of each token; encode at least pixel-level information of the raster image, the textual content and the coordinates of each token into an input to a machine learning/deep learning classification model via a second API call; and determine the form type of the input based at least in part on probabilities generated by the machine learning/deep learning classification model, the probabilities indicating a likelihood that the input corresponds to each of the plurality of form types.

In one embodiment, in response to detecting that the raster image of the input indicates the first form type, the computing server system may be configured to: partition the raster image into a left section, a right section, and a bottom-right section, each of the left section, the right section and the bottom-right section containing a portion of the document entities targeted for retrieval for the first form type; identify bounding coordinates of the left section, the right section, and the bottom-right section; remove, based on the bounding coordinates of the left section, whitespace around the raster image's top and bottom and approximately 20% of the raster image from a right side to generate a left section sub-image; remove, based on the bounding coordinates of the right section, whitespace around the raster image's top and bottom, and approximately 50% of the image from a left side to generate a right section sub-image; remove, based on the bounding coordinates of the bottom-right section, whitespace around the raster image's top and bottom, approximately ⅓ of the raster image from the left side, and approximately ¾ of the raster image from the top to generate a bottom-right section sub-image; and generate a first plurality of grayscale images by converting the left section sub-image, the right section sub-image, and the bottom-right section sub-image to grayscale.

In yet another embodiment, the computing server system may be configured to input the first plurality of grayscale images into a generative artificial intelligence model via one or more third API calls for extracting the document entities targeted for retrieval for the first form type.

In further embodiments, in response to detecting that the raster image of the input indicates the second form type, the computing server system may be configured to: partition the raster image into a left portion and a right portion, each of the left and right portions containing a portion of the document entities targeted for retrieval for the second form type; identify bounding coordinates of each of the left and right portions; apply, via a fourth API call, a computer vision object detection machine learning model to identify bounding coordinates of a plurality of tables located on the left portion of the raster image; generate table sub-images based on the bounding coordinates of the plurality of tables; remove, based on the bounding coordinates of the left portion and the plurality of tables, whitespace around the raster image's top and bottom and an area having the rightmost boundaries defined by the bounding coordinates of the plurality of tables to generate a first right portion sub-image; remove approximately ¼ the right portion of the raster image from top and bottom to generate a second right portion sub-image; and generate a second plurality of grayscale images by converting the table sub-images and the first and second right portion sub-images to grayscale.

In further embodiments, the computing server system may be configured to input the second plurality of grayscale images into a generative artificial intelligence model via one or more fifth API calls for extracting the document entities targeted for retrieval for the second form type.

In another embodiment, the computing server system may be configured to: employ an optical character recognition model to extract texts from the second right portion sub-image and identify position coordinates of each word in the texts extracted; convert the texts extracted into lowercase texts; and input the lowercase texts and the position coordinates of each word into a rule-based system to identify a selected label in the lowercase texts.

Moreover, the computing server system may be configured to: in response to locating the selected label in the lowercase texts, crop out an area around the selected label to include a numerical value that is in a close spatial proximity to the selected label based on the position coordinates; generate a grayscale image corresponding to the area cropped out; and input the grayscale image into a generative artificial intelligence model via a sixth API call to request an identification of the numerical value.

In accordance with another aspect, the present disclosure relates to a computer-implemented method, comprising: obtaining, by a processor of a computing device deployed within a communication network, an input in a portable document format (PDF) via a user interface element of an application program downloaded and stored on a non-transitory computer-readable storage medium of the computing device; receiving, by a computing server system deployed within the communication network, the input from the computing device via a first application programming interface (API) call; determining, by the computing server system, document entities to be identified and retrieved from the input in accordance with each of a plurality of form types; analyzing, by the computing server system, each of the plurality of document entities to determine a plurality of document data identification and retrieval computational techniques; generating, by the computing server system, a raster image of the input in accordance with a selected dot per inch (DPI); detecting, by the computing server system, a form type of the input based on the raster image of the input; in response to detecting that the raster image of the input indicates one of the plurality of form types, partitioning, by the computing server system, the raster image into a plurality of sections corresponding to document regions containing the document entities targeted for retrieval for the one of the plurality of form types, generating sub-images based on bounding coordinates of the plurality of sections, and applying one or more of the plurality of document data identification and retrieval computational techniques to extract the document entities from the sub-images; and saving, by the computing server system, processing results of the plurality of document data identification and retrieval computational techniques in identifying and retrieval of each of the document entities in at least one database.

In some embodiments, the computer-implemented method may further comprise de-skewing the raster image of the input to correct a rotation of the raster image.

In additional embodiments, the computer-implemented may further comprise: i) applying an optical character recognition technique to extract texts from a top left corner of the raster image; ii) comparing the texts to a plurality of selected terms associated with the first and second form types; iii) upon detecting a match between the texts and at least one of the plurality of selected terms, identifying a current orientation of the raster image as a proper orientation; iv) in response to detecting no match between the texts and at least one of the plurality of selected terms, performing a language detection of the texts and store a confidence score of the language detection; v) rotating the raster image by 90 degrees and repeat i), ii), iii) and iv) for 90 degrees, 180 degrees and 360 degrees; vi) selecting an orientation corresponding to a highest confidence score if no proper orientation of the input has been identified after v); and vii) rotating the raster image in connection with the orientation corresponding to the highest confidence score.

In further embodiments, the computer-implemented method may further comprise: extracting, by the computing server system, from the raster image, textual content represented by a list of tokens and coordinates of each token; encoding, by the computing server system, at least pixel-level information of the raster image, the textual content and the coordinates of each token into an input to a machine learning/deep learning classification model via a second API call; and determining, by the computing server system, the form type of the input based at least in part on probabilities generated by the machine learning/deep learning classification model, the probabilities indicating a likelihood that the input corresponds to each of the plurality of form types.

In yet another embodiment, in response to detecting that the raster image of the input indicates the first form type, the computer-implemented method may further comprise: partitioning, by the computing server system, the raster image into a left section, a right section, and a bottom-right section, each of the left section, the right section and the bottom-right section containing a portion of the document entities targeted for retrieval for the first form type; identifying, by the computing server system, bounding coordinates of the left section, the right section, and the bottom-right section; removing, by the computing server system based on the bounding coordinates of the left section, whitespace around the raster image's top and bottom and approximately 20% of the raster image from a right side to generate a left section sub-image; removing, by the computing server system based on the bounding coordinates of the right section, whitespace around the raster image's top and bottom, and approximately 50% of the image from a left side to generate a right section sub-image; removing, by the computing server system based on the bounding coordinates of the bottom-right section, whitespace around the raster image's top and bottom, approximately ⅓ of the raster image from the left side, and approximately ¾ of the raster image from the top to generate a bottom-right section sub-image; and generating, by the computing server system, a first plurality of grayscale images by converting the left section sub-image, the right section sub-image, and the bottom-right section sub-image to grayscale.

In yet another embodiment, the computer-implemented method may further comprise inputting, by the computing server system, the first plurality of grayscale images into a generative artificial intelligence model via one or more third API calls for extracting the document entities targeted for retrieval for the first form type.

In further embodiments, in response to detecting that the raster image of the input indicates the second form type, the computer-implemented method may further comprise: partitioning, by the computing server system, the raster image into a left portion and a right portion, each of the left and right portions containing a portion of the document entities targeted for retrieval for the second form type; identifying, by the computing server system, bounding coordinates of each of the left and right portions; applying, by the computing server system via a fourth API call, a computer vision object detection machine learning model to identify bounding coordinates of a plurality of tables located on the left portion of the raster image; generating, by the computing server system, table sub-images based on the bounding coordinates of the plurality of tables; removing, by the computing server system based on the bounding coordinates of the left portion and the plurality of tables, whitespace around the raster image's top and bottom and an area having the rightmost boundaries defined by the bounding coordinates of the plurality of tables to generate a first right portion sub-image; removing, by the computing server system, approximately ¼ the right portion of the raster image from top and bottom to generate a second right portion sub-image; and generating, by the computing server system, a second plurality of grayscale images by converting the table sub-images and the first and second right portion sub-images to grayscale.

In additional embodiments, the computer-implemented method may further comprise inputting, by the computing server system, the second plurality of grayscale images into a generative artificial intelligence model via one or more fifth API calls for extracting the document entities targeted for retrieval for the second form type.

In another embodiment, the computer-implemented method may further comprise: employing, by the computing server system, an optical character recognition model to extract texts from the second right portion sub-image and identify position coordinates of each word in the texts extracted; converting, by the computing server system, the texts extracted into lowercase texts; and inputting, by the computing server system, the lowercase texts and the position coordinates of each word into a rule-based system to identify a selected label in the lowercase texts.

In further embodiments, the computer-implemented method may further comprise: in response to locating the selected label in the lowercase texts, cropping out, by the computing server system, an area around the selected label to include a numerical value that is in a close spatial proximity to the selected label based on the position coordinates; generating, by the computing server system, a grayscale image corresponding to the area cropped out; and inputting, by the computing server system, the grayscale image into a generative artificial intelligence model via a sixth API call to request an identification of the numerical value.

The above simplified summary of example aspects serves to provide an understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 illustrates a cropped-out left section of a sample OSHA 300 with targeted entities highlighted, according to an exemplary aspect of the present disclosure.

FIG. 7 illustrates a cropped-out right section of a sample OSHA 300 with targeted entities highlighted, according to an exemplary aspect of the present disclosure.

FIG. 10 illustrates a cropped-out section for establishment information and annual average number of employees of a sample OSHA 300A with targeted entities highlighted, according to an exemplary aspect of the present disclosure.

DETAILED DESCRIPTION

Figure 1:
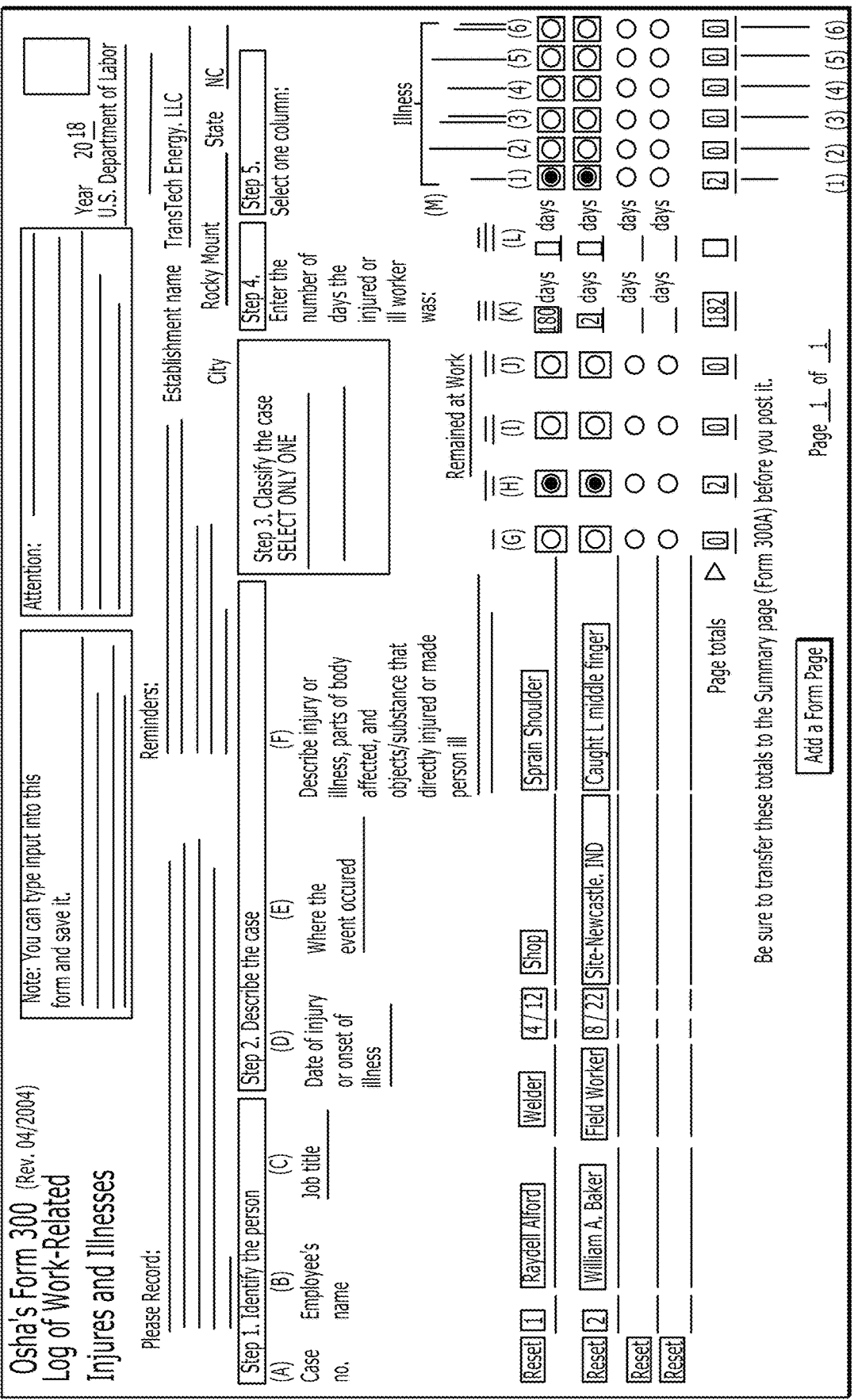
FIG. 1 illustrates an OSHA 300 (Log of Work-Related Injuries and Illnesses) with a number of highlighted entities for extraction, in accordance with aspects of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Figure 2:
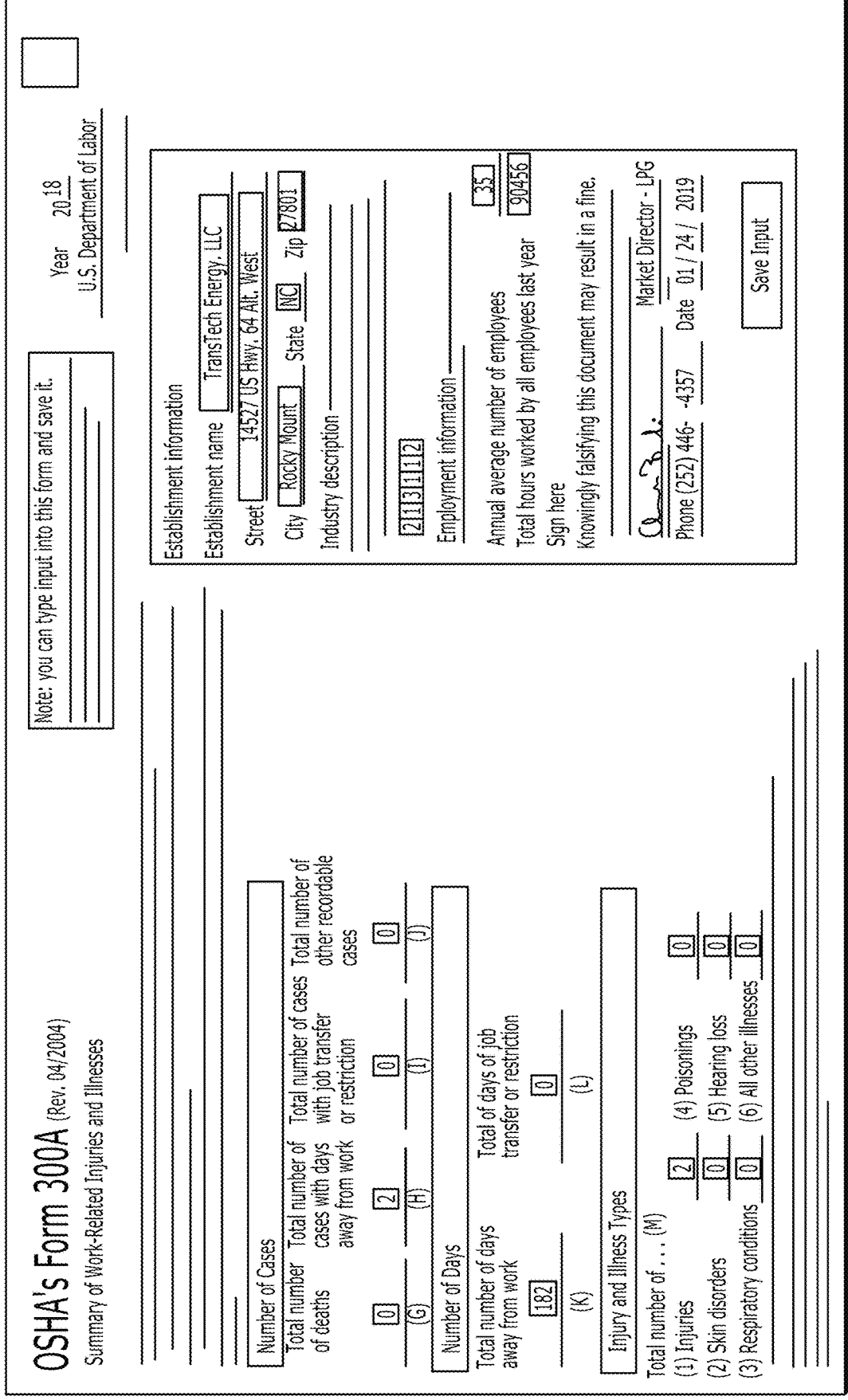
FIG. 2 illustrates an OSHA 300A (Summary of Work-Related Injuries and Illnesses) with a number of highlighted entities for extraction, in accordance with aspects of the present disclosure.

OSHA 300 forms (hereinafter "OSHA 300") are generally used to record specific details about each work-related injury or illness. As shown in FIG. 1, a standard OSHA 300 form may include the employee's name, job title, the nature of the injury or illness, the location where it occurred, and the number of days away from work or on restricted duty. Employers must maintain this log for 5 years. An OSHA 300A form is a summarized version of the OSHA 300 log used to inform employees. As shown in FIG. 2, a standard OSHA 300A form may include totals for the year (number of cases, days away from work, types of injuries/illnesses), but no personal employee information. OSHA 300A forms (hereinafter "OSHA 300A") must be posted in a visible location from February 1 to April 30 of the following year and must be signed by a company executive. Most employers with more than 10 employees in non-exempt industries are required to keep and maintain these forms unless they are in a low-risk industry such as some retail or finance sectors.

According to various embodiments, the present disclosure may be configured to analyze and process standardized forms such as OSHA 300 and OSHA 300A. As shown in FIG. 1, for OSHA 300, the disclosed computing system may be configured to extract information relating to all of the records for all the pages (columns A-L & 1-6) along with the page totals (for columns G-L & 1-6). For OSHA 300A, the disclosed computing system may be configured to extract information relating to all the totals for the 3 tables—

Number of Cases (G-J), Number of Days (K & L), and Injury and Illness Types (1-6), the establishment information, and the employment information were extracted. FIGS. 1 and 2 highlight a number of entities extracted for OSHA 300 and 300A respectively, in accordance with aspects of the present disclosure.

As will be described fully below, an initial step of an example pipeline of the present disclosure may comprise generating images of received inputs in portable document format (PDF) using e.g., a software. For example, an image (e.g., dots per inch (DPI) 200 or a model heuristic that produces the best results) for each page may be generated. These images may be used in the subsequent steps at different stages of the pipeline. In one aspect, at least one computer vision binary classification machine learning model may be trained for the purpose of identifying whether a given PDF is OSHA 300 or 300A, i.e., identifying the form type.

According to aspects of the present disclosure, the process for extracting information from a document containing an OSHA 300 or 300A may begin by segmenting the document page into spatially-defined regions for structured analysis. For example, the document page may be partitioned into a number of sections and extracting information from each of the sections separately. For example, referring to FIG. 1, a first section may include the left section of table which includes the columns A-J. A second section may include the right section of table which includes the columns K & L and 1-6. A third section relates to the "page totals" portion of an OSHA 300 which is located at the bottom of each page for columns G-L and 1-6. For each of these sections, one or more generative artificial intelligence (AI) models may be used by the computing system of the present disclosure to extract information from a cropped-out image of the document page.

With respect to extracting information from a document containing an OSHA 300A, the computing system of the present disclosure may similarly partition the document into a number of location-specific sections for downstream processing. For example, the document page may be initially divided into a number of sections and information may be extracted from each of the sections separately. Referring to FIG. 2, a first section may relate to the "Totals" which include the totals from the 3 tables (G-L and 1-6). The process for extracting information from the tables may use at least one computer vision object detection machine learning model trained for the task of identifying the position of the 3 tables in the image of the PDF and using a generative AI model to extract information from the identified areas. A second section may relate to "establishment information" and "annual average number of employees." A generative AI model may be used to extract the information from a cropped-out image of the document page. A third section includes "Total hours worked by all employees last year," as shown in FIG. 2. The process for extracting this information may include first using a computer vision machine learning technique (e.g., optical character recognition (OCR)) to extract the text from the generated images of the PDFs and then using a combination of a rule-based system employing a label-value technique and a generative AI model.

Figure 3:
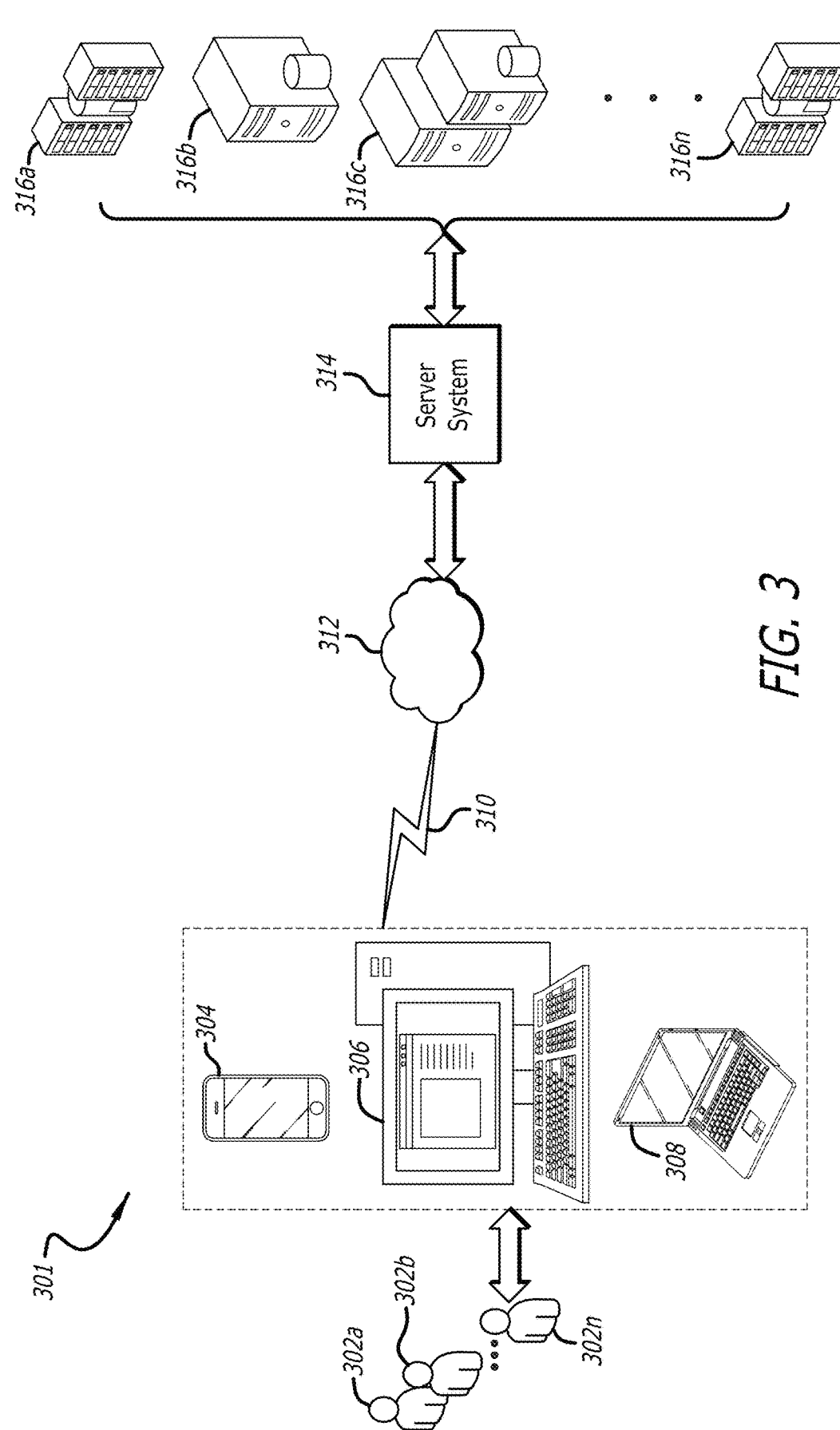
FIG. 3 illustrates a diagram of a computing system for transforming unstructured document data into a machine-readable format and employing advanced computer vision and machine learning techniques to extract key entities from the machine-readable format, according to an exemplary aspect of the present disclosure.

According to some embodiments, FIG. 3 illustrates a diagram of a computing system 301, deployed within a computing environment and communication network, for receiving documents related to OSHA 300 and/or 300A as inputs, converting selected document contents into structured data representations via a number of selected computer vision, machine learning, and AI techniques, parsing the structured data representations to identify and extract key information from the documents, and storing the extracted data into a machine-readable format.

In one embodiment, a user 302*a*, 302*b*, . . . 302*n* may use a selected computing device or system 304, 306, 308 to input data related to one or more OSHA 300 or 300A forms as shown in FIGS. 1 and 2, which may be transmitted to a server system 314, using suitable communication protocol(s) 310 and at least one communication network 312. Communication network 312 may generally include a geographically distributed collection of computing devices or data points interconnected by communication links and segments for transporting signals and data therebetween. The communication protocol(s) 110 may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the computing system 100 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

The server system 314 may be configured to train, host, incorporate, integrate, and/or make an application programming interface (API) call to at least one of a plurality of computing systems 316*a*, 316*b*, 316*c*, . . . 316*n* to process selected document contents into structured data representations, parse the structured data representations to identify and extract key information from the documents, and convert the extracted data into a machine-readable format. In a preferred embodiment, the plurality of computing systems 316*a*, 316*b*, 316*c*, . . . 316*n* may include one or more generative AI models and machine learning/deep learning models that may be or have been trained for processing received natural language user instructions and/or document data related to OSHA 300 and 300A. Generative AI may generally refer to a class of AI systems designed to generate new content, such as text, images, music, code, and more, based on patterns and inputs it has learned. Generative AI models may generate in multiple modalities, including but not limited to text (e.g., Anthropic, Open AI, Google DeepMind, Mistral, Meta, Cohere), images (e.g., DALL•E, Stable Diffusion), audio (e.g., Jukebox by OpenAI), and video (e.g., Runway ML). The generative AI models disclosed in the present disclosure may be built on various architectures like transformers, Generative Adversarial Networks (GANs), and diffusion models.

In various embodiments, the plurality of computing systems 316*a*, 316*b*, 316*c*, . . . 316*n* may include one or more large language models (LLMs) or simply language models which are a subset of AI models specifically focused on understanding, generating, and interacting with natural language. They use large-scale neural networks trained on massive text datasets. The term "large" refers to the size of these models in terms of the number of parameters or weights, which are the values that the model learns during training to make predictions and generate text. LLMs may have millions, billions (or even more) parameters, which enable such models to capture complex patterns and nuances in language that, in turn, allow these models to understand and generate more natural-sounding text (relative to previous approaches). Examples of LLMs include the generative pre-trained transformer models (e.g., Anthropic's Claude, GPT-4, Codex), Pathways Language Model (PaLM), Gemini, Language Model for Dialogue Applications (LaMDA), Bard, Large Language Model Meta Artificial Intelligence (LLaMA), Claude, Orca, Turing-NLG, Command R, Mistral, Mixtral, Grok, BigScience Large Open-science Open-access Multilingual Language Model (BLOOM), Luminous, Titan, Tongyi Qianwen, Enhanced Representation through Knowledge Integration (ERNIE), PanGu, NeMo, XGen, StableLM, Character LLM, and even non-generative examples such as bidirectional encoder representations from Transformers (BERT), etc.

In some embodiments, the server system 314 may be Cloud-based or an on-site server. The term "server" generally refers to a computing device or system, including processing hardware and process space(s), an associated computer readable storage medium such as a memory device or database, and, in some instances, at least one database application as is well known in the art. The server system 314 may provide functionalities for any connected devices such as sharing data or provisioning resources among multiple client devices, or performing computations for each connected client device. According to one embodiment, within a Cloud-based computing architecture, the server system 314 may provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, central processing units (CPUs), graphics processing units (GPUs), random access memory, caches, etc.), and storage devices (e.g., network attached storages, storage area network devices, hard disk drives, solid-state devices, etc.). In addition, such resources may be used to support virtual networks, virtual machines, databases, applications, etc. The term "storage device" or "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TeXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible using any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment, which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

In one embodiment, an application, which may include a mobile or web-based application (e.g., native iOS or Android Apps), may be downloaded and installed on the selected computing device or system 304, 306, or 308 for interacting with each user 302*a*, 302*b* . . . 302*n* which includes but not limited to individuals or teams responsible for reviewing OSHA 300 and/or 300A, system/network administrators, software developers, and other end-users. In some embodiments, the user 302*a*, 302*b*, . . . 302*n* may upload files or pictures related to one or more OSHA 300 and/or 300A via the application, or directly take one or more pictures of at least one OSHA 300 and/or 300A via a camera associated with the selected computing device or system 304, 306, 308 and send the pictures to the server system 314 via the application (e.g., via the communication protocol(s) 310 and communication network 312) when external processing may be needed.

User 302*a*, 302*b* . . . 302*n* may include safety managers, HR professionals, and employers who are responsible for accurately recording and maintaining these forms. These users may rely upon the OSHA 300 and/or 300A data to identify injury trends and evaluate workplace safety programs. Employers must certify the 300A summary annually and post it publicly from February 1 to April 30. OSHA may review 300 and 300A logs during inspections or investigations. User 302*a*, 302*b* . . . 302*n* may also include OSHA inspectors who may review 300 and 300A logs during inspections or investigations. Workers and their designated representatives (e.g., union reps) have a legal right to review the OSHA 300 logs (with some restrictions on privacy). This helps ensure transparency and allows workers to monitor workplace safety. Executives and risk management teams also review OSHA 300 logs to evaluate liability, assess performance, and set safety goals across multiple sites or departments. Workers' compensation insurers and brokers may analyze these logs to assess risk and determine premiums or evaluate claims. Attorneys and compliance officers may review logs during legal proceedings, audits, or due diligence processes (e.g., mergers/acquisitions). Automated agents, scripts, playback software, and the like acting on behalf of one or more people may also be user 302*a*, 302*b* . . . 302*n*. Such a user-facing application of the computing system 301 may include a plurality of modules and libraries executed and controlled by the microcontroller or processor of the hosting computing device or system 304, 306, 308 for performing functions locally on each computing device and/or making remote calls (e.g., API calls) to the server system 314 to access specific functionalities. The division of labor between local execution and server-side operations depends on how each module or library is designed and what its functions require.

According to some implementations, one or more libraries downloaded on the selected computing device or system 304, 306, 308 may be configured to perform all their operations locally without relying on the server system 314. That is, once a library is installed, it may access the resources and computing power available on each computing device or system 304, 306, 308 to execute tasks. For example, certain libraries may be configured to perform computations locally using each computing device's CPU/GPU. Further, file handling libraries may be configured to process files stored on the local device. If pre-trained AI or machine learning models are included in the library, they may run locally, depending on each device's capabilities. Local execution of these libraries may not require e.g., Internet connection. Since there is no network latency, execution is faster for these local operations. Further, there is a greater control over data privacy, since no data needs to be sent to an external server. However, limited by each device's hardware (e.g., memory, processing power), local execution may involve downloading potentially large libraries, models, or datasets.

According to another embodiment, remote execution (server-side processing) may be implemented, and libraries downloaded on each computing device or system 304, 306, 308 may make remote calls (e.g., API calls) to the server system 314 to access certain functionalities, for example, when the functions a library provides are too resource-intensive for local execution or require access to constantly updated data (e.g., real-time services, large-scale models, or databases). In this case, the library acts as a client-side interface that makes API requests to the server system 314 to perform specific tasks.

In one example, a library may interface with services like OpenAI's GPT, Google Cloud AI, Claude Sonnet, or Amazon S3, where the computation may be carried out on the server system 314, and the selected computing device or system 304, 306, 308 sends requests and receives results. In another example, libraries like AWS SDK, Google Cloud SDK may allow interaction with Cloud storage to upload, retrieve, and manipulate data on the Cloud.

Server-side processing may offload heavy computation to powerful servers (e.g., at least one of a plurality of computing systems 316*a*, 316*b*, 316*c*, . . . 316*n*), provide access to real-time data and updated services, and being device-agnostic by working even on devices with limited resources (smartphones, tablets, etc.).

According to additional embodiments, libraries implemented on each selected computing device or system 304, 306, 308 may adopt a hybrid model, where some operations or computations may be performed locally, while more complex or resource-intensive tasks are offloaded to the server system 314. For example, basic computations, pre-processing, or user interface elements may be handled locally, while complex processing, data retrieval, or heavy computations (e.g., running large AI models and LLMs, or interacting with databases) may be carried out via the server system 314.

Figure 4:
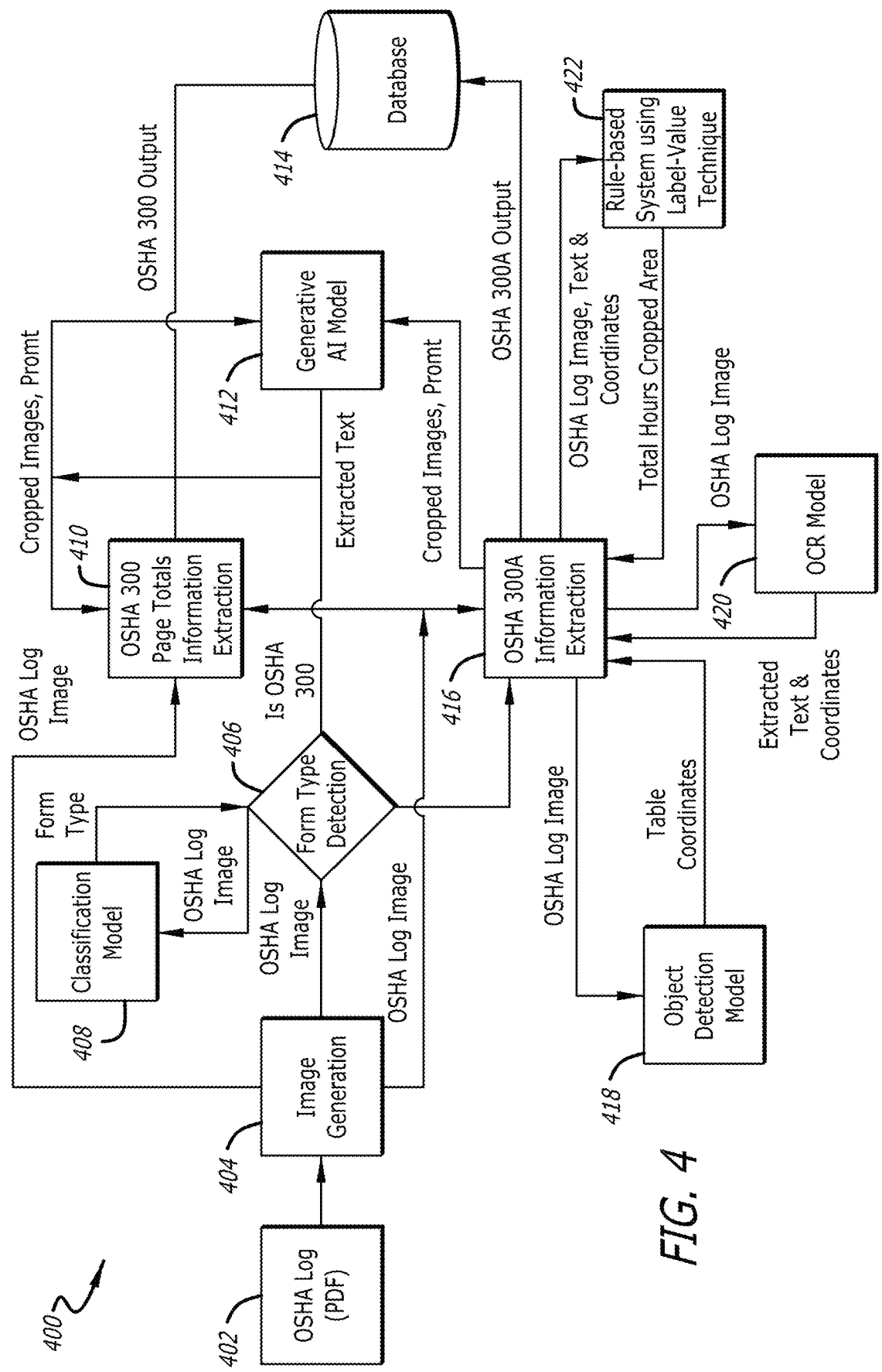
FIG. 4 illustrates a workflow carried out by the computing system of FIG. 3, according to an exemplary aspect of the present disclosure.
Figure 5:
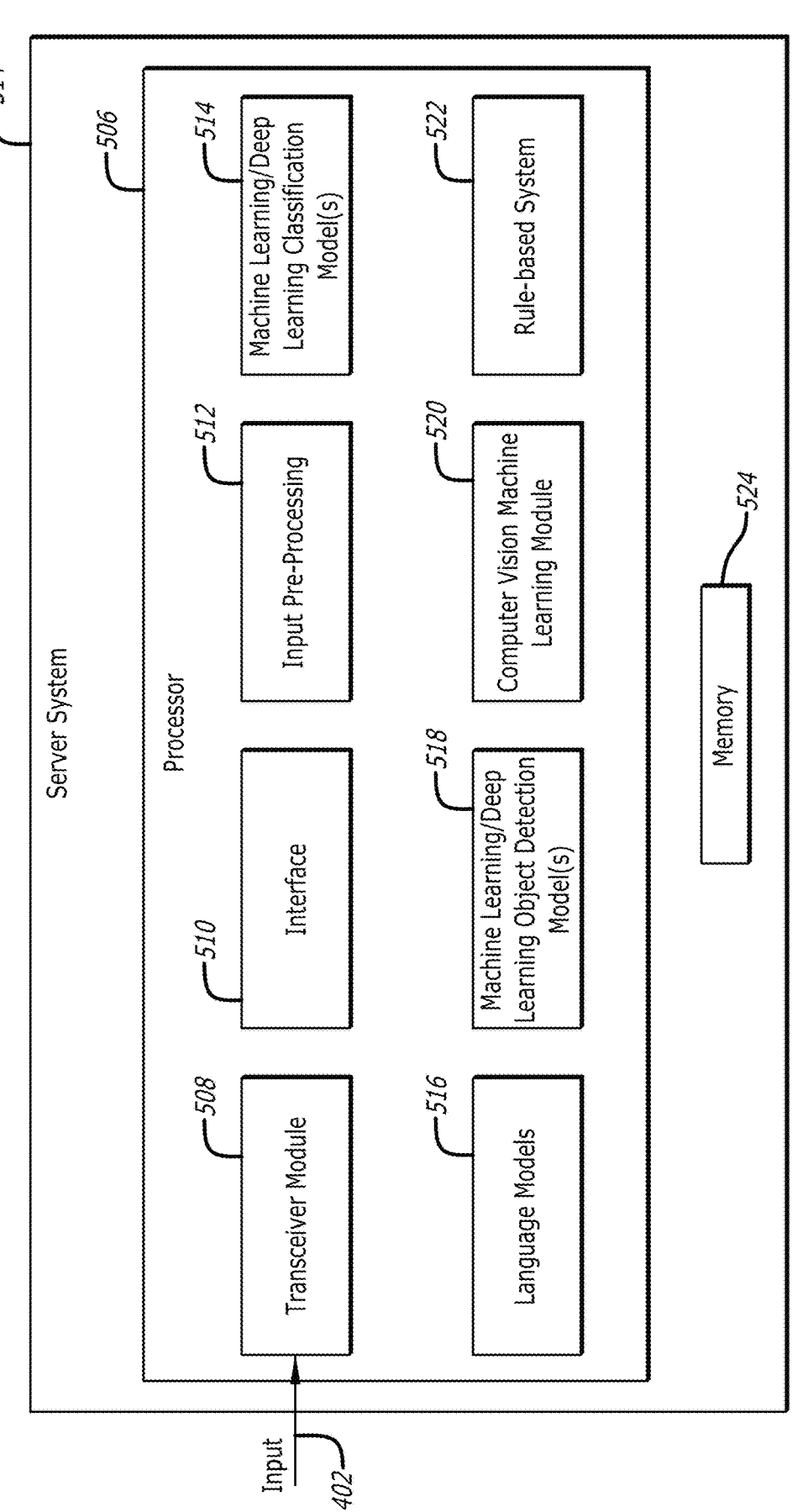
FIG. 5 illustrates a block diagram of an example computing server system, according to an exemplary aspect of the present disclosure.

In accordance with various aspects of the present disclosure, FIG. 4 illustrates an example multi-stage workflow or pipeline 400 carried out by the computing system 301 of the present disclosure for processing an input 402 in the PDF (e.g., an OSHA log such as OSHA 300 and/or 330A) received from a selected computing device or system 304,

306, 308. FIG. 5 illustrates a block diagram of the server system 314 configured to extract key information and entities from the input 402, according to some implementations. For example, at least one processor 506 of the server system 314 may be configured to control and execute a plurality of modules, machine learning and AI models, systems including but not limited to a transceiver module 508, an interface 510, an input pre-processing module 512, machine learning/ deep learning classification model(s) 514, language model(s) 516, machine learning/deep learning object detection model(s) 518, a computer vision machine learning module 520, and a rule-based system 522. The term "module," "model," and "system" as used herein refers to a real-world device, component, or arrangement of components and circuitries implemented using hardware, such as by an application specific integrated circuit (ASIC) or field-programmable gate array (FPGA), for example, or as a combination of hardware and software, such as by a micro-processor system and a set of instructions to implement the module's, model's, or system's functionality, which (while being executed) transform the microprocessor system into a special purpose device. A module, model or system may also be implemented as a combination of the two, with certain functions facilitated by hardware alone, and other functions facilitated by a combination of hardware and software. Each module, model, or system may be realized in a variety of suitable configurations and should not be limited to any example implementation exemplified herein.

Memory 524, which is coupled to processor 506, may be configured to store at least a portion of information obtained by the server system 314. In one aspect, memory 524 may be a non-transitory computer readable medium configured to store at least one set of data structures or instructions (e.g., software) embodying or utilized by at least one of the techniques or functions described herein. It should be appreciated that the term "non-transitory computer readable medium" may include a single medium or multiple media (e.g., one or more caches) configured to store at least one instruction. The term "computer readable medium" may include any medium that is capable of storing, encoding, or carrying instructions for execution by all modules, engines or systems of the server system 314 and that cause these modules, models or systems to perform at least one of the techniques of the present disclosure, or that is capable of storing, encoding or carrying data structures used by or associated with such instructions. Non-limiting computer readable medium examples may include solid-state memories, and optical and magnetic media. Specific examples of computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

In various embodiments, the transceiver module 508 of the server system 314 may be controlled by processor 506 to exchange various information and data with other computing devices deployed within the communication network 312 and connected with the server system 314 (e.g., the computing device or system 304, 306, or 308 and/or computing systems 316a, 316b, 316c, . . . 316n of FIG. 3).

The interface 510 may be controlled by processor 506 to provide necessary communication and interaction functions between various software components, hardware components, or users. For example, interface 510 may provide a set of functions or protocols for other components to interact with a particular system or service, or be a physical device or circuitry that connects different electronic components or systems. For example, the user-facing application downloaded and installed on each hosting computing device or system 304, 306, or 308 of FIG. 3 may be a thin client device/terminal/application deployed within the computing system 301 and may be configured to perform certain preliminary processing of data relating to any received data from user 302a, 302b . . . 302n. Thereafter, the processed data may be transmitted to server system 314 for further processing, if needed. In one embodiment, the interface 510 may include an API interface configured to make one or more API calls therethrough. For example, the computing systems 316a, 316b, 316c, . . . 316n of FIG. 3 may include one or more generative AI models and machine learning models, and the API interface of the server system 314 may exchange data with each model's API. On the other hand, the server system 314 may include an API gateway device (not shown) configured to receive and process API calls from various connected computing devices deployed within the system 300 (e.g., an operating system, a library, a device driver, an API, an application program, software or other module). Such an API gateway device may specify one or more functions, methods, classes, objects, protocols, data structures, formats and/or other features of the server system 314 that may be used by the mobile or web-based application. For example, the API interface included in interface 510 may define at least one calling convention that specifies how a function associated with the server system 314 receives data and parameters from a requesting device/ system and how the function returns a result to the requesting device/system. It should be appreciated that the server system 314 may include additional functions, methods, classes, data structures, and/or other features that are not specified through the API interface and are not available to a requesting computing device.

According to some aspects, the processor 506 of the server system 314 may control the transceiver module 508 and interface 510 to receive the input 402 (e.g., an OSHA 300 or 300A in PDF). In one embodiment, interface 510 may be configured to employ an API to initiate a plugin service provided by e.g., one of the computing systems 316a, 316b, 316c, . . . 316n. Processing results may be displayed via a user interface associated with the application downloaded and installed on the selected computing device or system 304, 306, or 308 for interacting with each user 302a, 302b . . . 302n. For example, a user may enter the input 402 into a user interface element of the application (e.g., uploading an OSHA 300 or 300A in PDF or directly taking a picture of an OSHA 300 or 300A form which may be converted into PDF by the application) and interact with outputs via a selection of user interface elements (e.g., choosing an output from a drop-down menu or a list of outputs, performing a click-and-drag operation, editing a selected AI/ML model output, etc.).

Referring to FIGS. 4 and 5, to prepare the input 402 for multiple steps in the workflow 400, the input pre-processing module 512 may be configured to generate images of the OSHA PDFs. According to one implementation, a file path or byte stream of the input 402 may be passed to a PDF rendering library which may use command-line tools to convert each PDF page of the input 402 into raster images (e.g., TIFF, BMP, PNG or JPEG). A raster image is a type of digital image that is composed of a grid of individual pixels, each with its own color and intensity. The key characteristics of a raster image may include fixed resolution (enlarging causes loss of quality) and pixel-based (not vector-based). For each page, the content may be rendered into a bitmap in accordance with a number of selected parameters. For example, DPI, which is a measure of resolution, may be set (e.g., DPI 200) and higher DPI leads to clearer images. Further, image format (JPEG, PNG, etc.) and page range (e.g., converting all or specific pages of the input 402) may be specified. As a result, in one embodiment, the output may include a list of PIL.Image objects (from the Pillow library), which may be manipulated and/or saved in e.g., memory 524.

The generated images may be then de-skewed to correct the tilt or rotation of each image. For example, the input pre-processing module 512 may analyze each image to estimate the angle at which it is rotated (skewed) and apply a rotation transform to straighten each image so that horizontal and vertical lines are properly aligned.

In some embodiments, the input 402 may contain scanned images of the forms rotated at one of the 4 degrees: 0°, 90°, 180°, and 360°. To correct the orientation of each image, the input pre-processing module 512 may use a selected computer vision machine learning technique (e.g., OCR) to get the text from the top left corner of each image and determine whether common terms likely to be present at the top left corner of the forms ("osha", "form 300", "log", "summary", etc.) are present in the text or not. If such terms are located, the current orientation may be determined to be the proper orientation. If not, the input pre-processing module 512 may be configured to detect the language of the extracted text and store the confidence score associated with the detection. The input pre-processing module 512 may repeat the aforementioned three steps by rotating the image by 90 degrees in order to cover all the 4 possible orientations. If the proper orientation has not been identified yet, the orientation corresponding to the highest confidence score may be determined to be the proper orientation. The input pre-processing module 512 may accordingly rotate the images to their proper orientations.

In one example dataset, for OSHA 300 forms containing multiple pages, all the pages may have the same orientation, and the first page may be used to identify the proper orientation of the pages. For example, an OSHA 300 PDF document may contain tables extending to more than one page. In those cases, all the pages of a document may have the same orientation, and the first page may be used to identify the orientation of the entire document.

Referring still to FIGS. 4 and 5, the generated images may be used for form type detection 406 using a classification model 408. The input 402 may include a PDF document which is either OSHA 300 or 300A. In one embodiment, the machine learning/deep learning classification model(s) 514 may include pre-trained model(s) that have been fine-tuned by the processor 506 for the task of binary image classification on a custom dataset, predicting whether a given image is OSHA 300 or 300A. For example, the image of the first page of the document may be used as the input to the machine learning/deep learning classification model(s) 514.

In some aspects, the machine learning/deep learning classification model(s) 514 may include advanced document understanding models by employing a unified multimodal framework that simultaneously processes textual, layout, and visual information. Single-stream architecture may be used by such models to efficiently integrate different modalities without requiring separate encoders. The machine learning/deep learning classification model(s) 514 may use a self-supervised pre-training approach to incorporate three key objectives: masked language modeling, masked image modeling, and word-patch alignment. This enables the machine learning/deep learning classification model(s) 514 to develop robust representations that capture the intricate relationships between textual content and visual elements within documents. The architecture may be transformer-based, treating document images as sequences of patches while preserving spatial information through 2D positional embeddings. This design, combined with its pre-training methodology, allows the machine learning/deep learning classification model(s) 514 to achieve state-of-the-art performance across various document understanding tasks, including form understanding, receipt analysis, and document visual question answering tasks.

In certain embodiments, the generated image of the input 402 may be used to extract text content (list of words or tokens) and bounding boxes (2D layout (coordinates for each token, typically $[x_0, y_0, x_1, y_1]$). For example, the top-left corner of each image may be prioritized, as the form's identity (e.g., "OSHA 300") often appears there: words=["OSHA", "Form", "300", "Log", "of", "Work-Related", "Injuries" ]; boxes=[[50, 30, 120, 50], [125, 30, 165, 50], [170, 30, 200, 50], . . . ].

Next, the machine learning/deep learning classification model(s) 514 may encode visual features (pixel-level information from image), textual content (tokens), and layout features (spatial positions of tokens) into a multimodal transformer-compatible format (input_ids, attention_mask, bbox, pixel_values, etc.). The encoded input may be passed to the fine-tuned binary classifier associated with the machine learning/deep learning classification model(s) 514. According to some implementations, fine-tuning may only use visual inputs (images) using Hugging Face's Transformers library. During fine-tuning, the classification model 408 learned to associate specific combinations of text, layout, and visual context (like the phrase "OSHA Form 300" in the top-left area) with the class label "1". For example, the transformer layers may combine the token content with spatial layout and visual cues. The final [CLS] embedding summarizes the entire document's multimodal representation and feeds into a classifier head. Subsequently, the machine learning/deep learning classification model(s) 514 may interpret logits to classify the document as OSHA 300 or 300A. In deep learning, the logits are the raw, unnormalized scores output by the model's final linear layer before applying softmax function. In one implementation, the classification model 408 may have num_labels=2 and label mapping={0="OSHA 300", 1="OSHA 300A"}. In processing the input 402, the classification model 408 may return raw scores for logits[0][0]: OSHA 300 and logits[0][1]: OSHA 300A. These scores indicate how strongly the classification model 408 determines the input 402 belongs to each class but are not probabilities yet. To convert these raw scores into interpretable probabilities, a softmax function may be applied. This function transforms the logits into two probability values that sum to 1, representing the model's confidence in each class. Once the probabilities are computed, the classification model 408 may employ a method called "argmax," which is used to identify the index (position) of the highest probability. For a binary classifier with two classes, the index may be either 0 or 1. The index with the highest value indicates which class the model predicts. Finally, the classification model 408 may map that index to a label. For example, if the highest probability corresponds to index 0 representing "OSHA 300", then the classification model 408's determination is OSHA 300. If it corresponds to index 1, and index 1 is defined as "OSHA 300A", then the classification result is OSHA 300A.

In another embodiment, the machine learning/deep learning classification model(s) 514 may employ two binary classifiers, where a first binary classifier may detect OSHA vs. Not OSHA (e.g., Output: 0=not OSHA, 1=OSHA) and a second binary classifier may distinguish OSHA 300 vs. OSHA 300A. For example, the second binary classifier may be activated only if the first binary classifier identifies the input 402 as "OSHA" and the output may be 0=OSHA 300, 1=OSHA 300A.

In yet another embodiment, the classification model 408 may be a multi-class classifier (e.g., 3 classes). For example, the machine learning/deep learning classification model(s) 514 may train a 3-class classifier (num_labels=3) with data labels (0=not OSHA, 1=OSHA 300, 2=OSHA 300A).

When the generated image 404 of the input 402 is passed through the trained multi-class classification model 408, three logits may be generated, one for each possible class. These logits are unnormalized scores that indicate how confident the model is about each class, but they do not yet represent probabilities. The softmax function may be applied to transform the three logits into a set of three probability values, one for each class. These probabilities add up to 100%, and each value reflects how likely the model determines the input belongs to that particular class. Next, argmax may be employed to select the index of the highest probability among the three and that index corresponds to the class that the model considers the best match for the input 402. Finally, this numerical index is mapped to a descriptive class label. For example, index 0 may map to "Not OSHA," index 1 to "OSHA 300," and index 2 to "OSHA 300A." If the highest probability is at index 2, the input 402 is determined to be "OSHA 300A."

Figure 8:
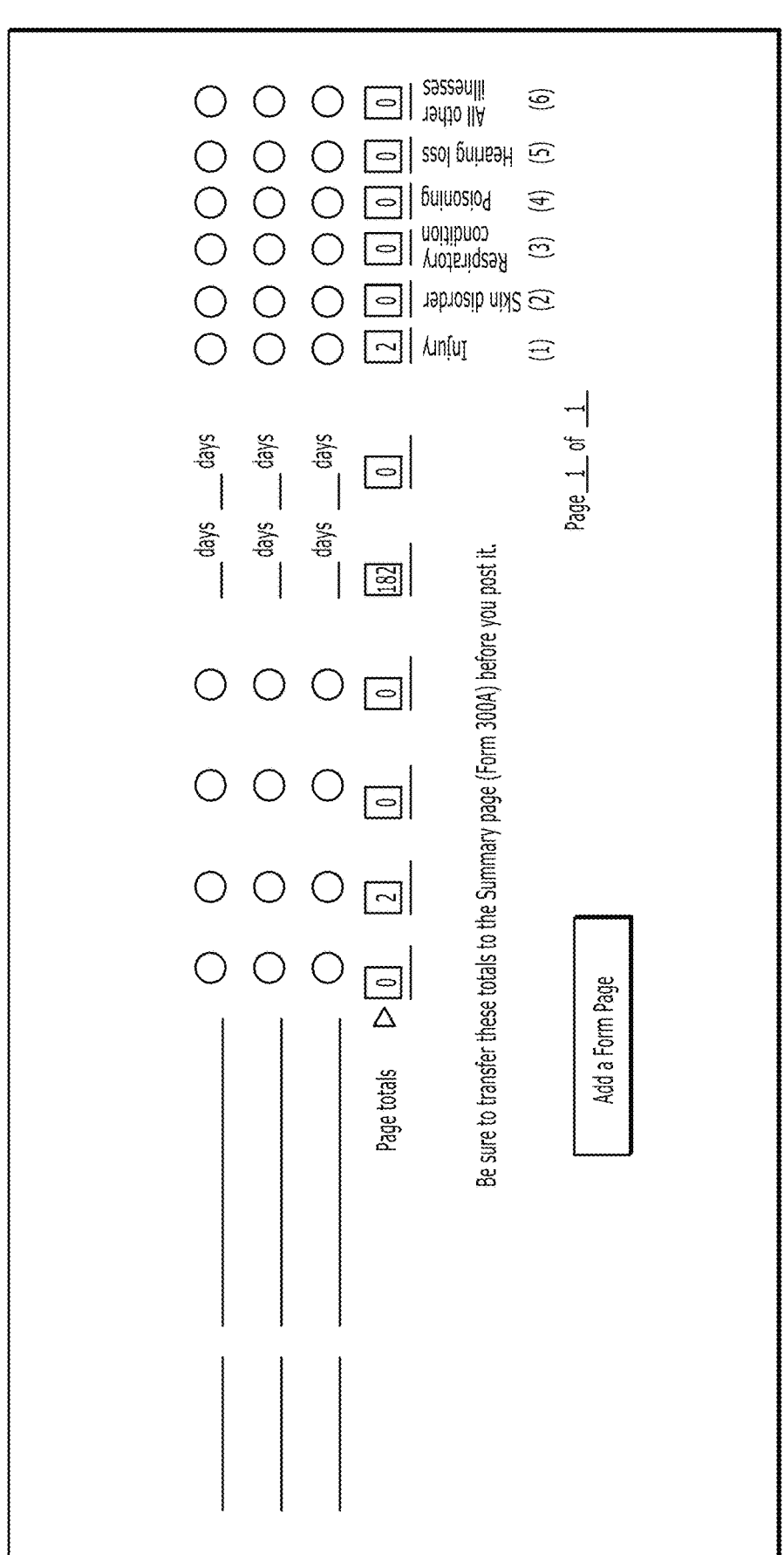
FIG. 8 illustrates a cropped-out "page totals" section of a sample OSHA 300 with targeted entities highlighted, according to an exemplary aspect of the present disclosure.

In response to determining that the input 402 is OSHA 300, the table contents of the input 402 may be divided into left and right sections for information extraction. In an embodiment, a cropped out left section may contain columns A-J, as shown in FIG. 6; and a cropped out right section may contain columns K & L and 1-6, as shown in FIG. 7. The rationale for this split is based on the observation that the generative AI model 412 in the downstream processing often seemed to get confused between the columns H and K, which indicate whether the employee had days away from work or not and the number of days away from work respectively, when the generative AI model 412 was prompted to extract both of the information together. This was also true for columns I and L. A higher degree of accuracy for the "page totals" section in the input 402 may be achieved and they can be directly used to calculate the safety metrics, TRIR and DART. Therefore, the section containing the "page totals" may be cropped out roughly and input to the generative AI model 412 separately for information extraction 410, as shown in FIG. 8. The fairly uniform structure of the forms allowed the server system 314 to roughly crop out the sections using the same approximate coordinates for all input documents.

In certain embodiments, with respect to information extraction of the left section, referring to FIG. 5, the processor 506 of the server system 314 may use approximate coordinates to remove the whitespace around the generated image's top and bottom, and ~20% of the image from the right side. The cropped-out image, as shown in FIG. 6, may be converted to grayscale and input to the language model 516 (e.g., Claude 3.5 Sonnet v2 model) through a first API call, by the processor 506, along with a prompt to extract the entities. The language model 516 may also be prompted to return an output in JSON format.

Similarly, with respect to information extraction of the right section, the processor 506 may use approximate coordinates to remove the whitespace around the generated image's top and bottom, and ~50% of the image from the left side. The cropped-out image, as shown in FIG. 7, may be converted to grayscale and input to the language model 516 through a second API call, by the processor 506, along with a prompt to extract the entities. The language model 516 may also be prompted to return an output in JSON format.

For "page totals" section, the processor 506 may use approximate coordinates to remove the whitespace around the generated image's top and bottom, ~⅓ of the image from the left side, and ~¾ of the image from the top. The cropped-out image, as shown in FIG. 8, may be converted to grayscale and input to the language model 516 through a third API call, by the processor 506, along with a prompt to extract the entities. The language model 516 may also be prompted to return an output in JSON format.

It should be appreciated that the inputs to the language model 516 may be implemented as a sequence of API calls or parallelize the process to improve latency. In one embodiment, the processor 506 may instruct the language model 516 to return multiple targeted extractions in one call by giving clear, structured instructions, such that the language model 516 extracts all requested information in one pass. In another embodiment, when scaling for large documents or datasets, parallel API calls may be implemented by the processor 506 to partition each received document(s) into logical chunks or sections, assign each chunk to a separate asynchronous API call, each with a focused extraction goal, and aggregate the responses from the language model 516 after the calls complete. In yet another embodiment, the processor 506 may define a function schema for each portion to extract. This ensures the language model 516 returns a structured response, extracting multiple parts in one API call with high reliability and post-processing ease.

For each of the three sections, the corresponding cropped grayscale section of the document containing part of a table may be preprocessed including but not limited to one of more of noise reduction, resizing, thresholding (binarization) to enhance text clarity, rotation correction (de-skewing), if needed. These preprocessing may ensure higher OCR accuracy. In certain embodiments, a dedicated OCR engine may be used to extract raw text and possibly layout information (e.g., bounding boxes and line structure) from the cropped image. If layout information is preserved, the language model 516 may understand table structure.

The language model 516 may be configured to use its understanding of language and formatting to identify and extract named entities (e.g., names, dates, codes, injuries), interpret table rows and columns if the layout was retained in the text, and return the results in a structured format (JSON, list, CSV). The language model 516 may perform entity extraction based on patterns learned during training, not pixel-level image features.

Alternatively, the language model 516 may perform post-processing to clean or validate the extracted entities in order to match against known categories, normalize formats (e.g., dates), and resolve ambiguities or fill in missing data.

One example prompt may be "Extract the following entities from this document text: Employee Name, Date of Incident, Injury Type, and return them in JSON format." This JSON output is machine-readable, can be parsed by downstream code, and is ideal for integration into the automation workflow 400. The output by the generative AI model 412 may be stored in database 414 accessible by other computing devices deployed within the computing system 301.

On the other hand, in response to determining that the input 402 is OSHA 300A, the workflow 400 proceeds to the OSHA 300A information extraction 416. The computing system 301 is designed to have a higher degree of accuracy for the totals from the 3 tables 902, 904, and 906 in FIG. 9 and the "total hours worked by all employees last year" 908 as they can be directly used to calculate the safety metrics, TRIR and DART. The sections containing these pieces of information may be more closely cropped out using the steps described below.

Figure 9:
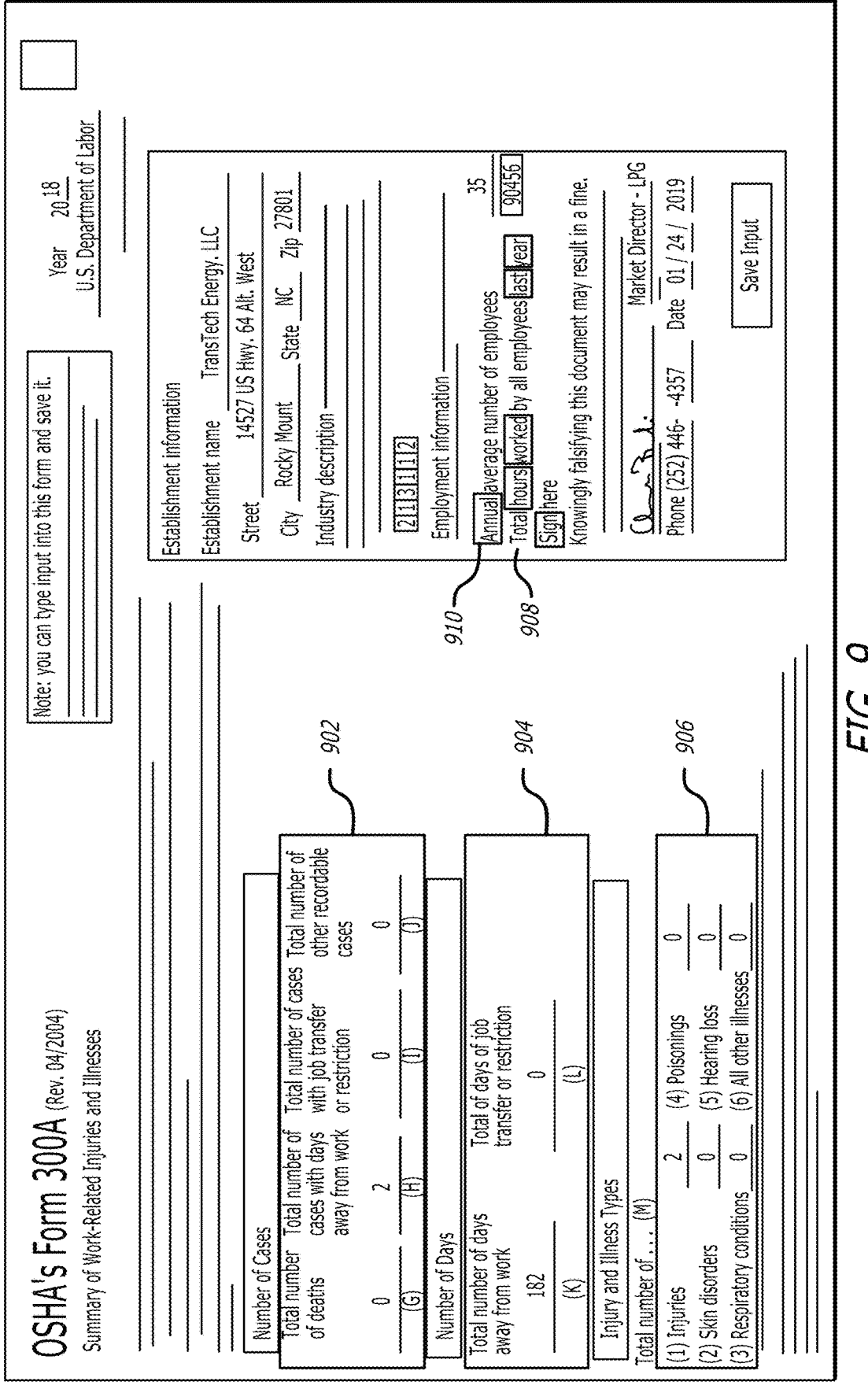
FIG. 9 illustrates a sample OSHA 300A having predicted bounding boxes for 3 tables and labels (highlighted texts) and value (highlighted numerical value) for the total hours worked by all employees last year, according to an exemplary aspect of the present disclosure.

According to some embodiments, the totals from the 3 tables 902, 904, and 906 may be extracted using a combination of an object detection model 418 trained for the task of identifying the position of the 3 tables in the image, and the generative AI model 412 to extract the information from the identified areas. The object detection model 418 may be developed by fine-tuning a pre-trained multimodal model on a custom dataset. For example, such a pre-trained multimodal model may include a transformer-based model designed for document understanding tasks and has been pre-trained on large datasets of scanned documents with text, layout, and visual features (e.g., scanned OSHA 300/300A forms annotated with entity tags, bounding boxes, or class labels), thereby understanding basic document structures like tables, forms, and text blocks. In one embodiment, the processor 506 of the server system 314 may control machine learning/deep learning object detection model(s) 518 to incorporate the pre-trained model and train it further on a specific, labeled dataset to extract a number of targeted entities from OSHA 300 and/or 300A. It takes the image of an OSHA 300A document as the input and returns the bounding box coordinates of the 3 tables, as shown in FIG. 9. The list of the cropped-out images converted to grayscale may be sent to the generative AI model 412 through an API call along with a prompt to extract the entities. The generative AI model 412 may also be prompted to return an output in JSON format.

With respect to extracting information from "Establishment information: Annual average number of employees" 910 in the input 402, the processor 506 may use approximate coordinates to remove the whitespace around the generated image's top and bottom. The left side of the image until the rightmost boundary of the bounding box coordinates of the tables 902, 904, and 906 may be removed. The cropped-out image, as shown in FIG. 10, may be converted to grayscale and input into the generative AI model 412 through an API call along with a prompt to extract the entities. The generative AI model 412 may also be prompted to return an output in JSON format.

Output in JSON format may generally include a rigid structure (key-value pairs), which may eliminate ambiguity in LLM outputs. Such structured outputs also make a frontend or backend system to effectively programmatically parse and use the LLM outputs without custom string processing. According to one implementation, the user interface design of the application downloaded and installed on at least one requesting computing device or system 304, 306, 308 may natively consume JSON data, thereby enabling direct binding of LLM outputs to interface components like tables, cards, lists, forms, etc., and reducing glue code (i.e., the code that connects different parts of a program or system together, often when those parts are not inherently compatible or designed to work together). Post-processing complexity may be significantly reduced at least because, with structured JSON, the computing system of the present disclosure may not need to parse natural language or regex-match output. Further, JSON schema validation may be used to check completeness and correctness of LLM output. JSON outputs also facilitate multi-language or API integration. It is easier to pass LLM JSON outputs to other services (e.g., database, analytics, external APIs) without conversion. UI, logging, caching, and analytics systems can all consume the same JSON outputs without transformation.

With respect to extracting information relating to "Total hours worked by all employees last year" 908, as shown in FIG. 9, the processor 506 may first remove the top and bottom ¼ of the image and control computer vision machine learning module 520 (e.g., the OCR model 420 in FIG. 4) to extract the text from the cropped-out image along with the position coordinates for each of the words in the extracted text. The text may be converted to lowercase, and along with the coordinates, may be used in a rule-based system 522 to identify the area containing the entity. The rule-based system 522 may be configured to identify a label in the texts (using regular expressions) which would be in close spatial proximity to the value to be extracted (e.g., rule-based system using label-value technique 422 in FIG. 4). The text may be searched for the terms (labels) "hours", "worked", "annual", "last year", or "sign", one by one in that order, shown in FIG. 9. In one embodiment, the order of the labels may be determined heuristically by observing what provides the best results. The ordering may be based on a combination of: 1) what allows a closer cropping of the "value", and 2) what is easier for the OCR model to recognize correctly. If the term is found, its coordinates (obtained in the OCR results) may be used to crop out an area around it. Rough estimates may be determined to ensure that the area is large enough (but not too large) to include the value inside it. The cropped-out image may be converted to grayscale and input into the generative AI model 412 through an API call, along with a prompt to return numerical value in the image. If none of the terms are found in the text, the cropped-out image of FIG. 10 may be input to the generative AI model 412 with a different prompt to extract the entity.

According to additional embodiments, information relating to the entities extracted from the input 402 (e.g., server-side analysis, model inference, classification) may be transmitted by the transceiver module 508 of the server system 314 to the application downloaded and installed on at least one requesting computing device or system 304, 306, 308 for display, such that user 302a, 302b . . . 302n may interact with the outputs by the server system 314 via the application.

It should be appreciated that, although the computing system and method of the present disclosure has been described for processing OSHA 300 and 300A, the disclosed aspects may be employed for processing other OSHA recordkeeping forms (e.g., OSHA Form 301—Injury and Illness Incident Report) and non-OSHA forms. Some similar or related non-OSHA forms may include workers' compensation claims forms which vary by state and insurance provider but often capture overlapping information (employee, injury, treatment) (e.g., DWC-1 (California) or C-2F (New York)). Another example form may include "Employer's First Report of Injury/Illness" which may be required by state workers' comp agencies or insurers and usually triggered immediately after an incident, prior to any OSHA report. Some government agencies may have their own incident reporting formats that build on OSHA standards. Additionally, many companies may use custom digital or paper forms that mirror OSHA 300/301/300A for internal use, audits, or insurance reporting.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Any reference to "one aspect," "an aspect," "an implementation," "one example," and the like means that a particular feature, structure, or characteristic described in connection with the aspect is included in at least one aspect. Thus, appearances of the phrases "in one aspect," "in an aspect," "in an implementation," and "in one example" in various places throughout the specification are not necessarily all referring to the same aspect. Furthermore, the particular features, structures or characteristics may be combined in any suitable manner in one or more aspects.

The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated.

The invention claimed is:

1. A system deployed within a communication network, the system comprising:

a computing device deployed within the communication network, the computing device comprising:

a non-transitory computer-readable storage medium configured to store an application program, a processor coupled to the non-transitory computer-readable storage medium and configured to control a plurality of modules to execute instructions of the application program to obtain an input in a portable document format (PDF) via a first user interface element of the application program; and a computing server system configured to:

receive the input from the computing device via a first application programming interface (API) call, determine document entities to be identified and retrieved from the input in accordance with each of a plurality of form types, analyze each of the document entities to determine a plurality of document data identification and retrieval computational techniques, generate a raster image of the input in accordance with a selected dot per inch (DPI), extract, from the raster image, textual content represented by a list of tokens and coordinates of each token, encode at least pixel-level information of the raster image, the textual content and the coordinates of each token into another input to a machine learning/deep learning classification model via a second API call, detect a form type of the input based on the raster image of the input by determining the form type of the input based at least in part on probabilities generated by the machine learning/deep learning classification model, the probabilities indicating a likelihood that the input corresponds to each of the plurality of form types, in response to detecting that the raster image of the input indicates one of the plurality of form types, partition the raster image into a plurality of sections corresponding to document regions containing the document entities targeted for retrieval for the one of the plurality of form types, generate sub-images based on bounding coordinates of the plurality of sections, and apply one or more of the plurality of document data identification and retrieval computational techniques to extract the document entities from the sub-images, and save processing results of the plurality of document data identification and retrieval computational techniques in identifying and retrieval of each of the document entities in at least one database.

2. The system of claim 1, wherein the computing server system is further configured to de-skew the raster image of the input to correct a rotation of the raster image.

3. The system of claim 2, wherein the computing server system is further configured to:

i) apply an optical character recognition technique to extract texts from a top left corner of the raster image;

ii) compare the texts to a plurality of selected terms associated with the plurality of form types;

iii) upon detecting a match between the texts and at least one of the plurality of selected terms, identify a current orientation of the raster image as a proper orientation;

iv) in response to detecting no match between the texts and at least one of the plurality of selected terms, perform a language detection of the texts and store a confidence score of the language detection;

v) rotate the raster image by 90 degrees and repeat i), ii), iii) and iv) for 90 degrees, 180 degrees and 360 degrees;

vi) select an orientation corresponding to a highest confidence score if no proper orientation of the input has been identified after v); and vii) rotate the raster image in connection with the orientation corresponding to the highest confidence score.

4. The system of claim 1, wherein, in response to detecting that the raster image of the input indicates a first form type, the computing server system is configured to:

partition the raster image into a left section, a right section, and a bottom-right section, each of the left section, the right section and the bottom-right section containing a portion of the document entities targeted for retrieval for the first form type;

identify bounding coordinates of the left section, the right section, and the bottom-right section;

remove, based on the bounding coordinates of the left section, whitespace around the raster image's top and bottom and approximately 20% of the raster image from a right side to generate a left section sub-image;

remove, based on the bounding coordinates of the right section, whitespace around the raster image's top and bottom, and approximately 50% of the raster image from a left side to generate a right section sub-image;

remove, based on the bounding coordinates of the bottom-right section, whitespace around the raster image's top and bottom, approximately ⅓ of the raster image from the left side, and approximately ¾ of the raster image from the top to generate a bottom-right section sub-image; and generate a first plurality of grayscale images by converting the left section sub-image, the right section sub-image, and the bottom-right section sub-image to grayscale.

5. The system of claim 4, wherein the computing server system is configured to input the first plurality of grayscale images into a generative artificial intelligence model via one or more third API calls for extracting the document entities targeted for retrieval for the first form type.

6. The system of claim 1, wherein, in response to detecting that the raster image of the input indicates the second form type, the computing server system is configured to:

partition the raster image into a left portion and a right portion, each of the left and right portions containing a portion of the document entities targeted for retrieval for the second form type;

identify bounding coordinates of each of the left and right portions;

apply, via a fourth API call, a computer vision object detection machine learning model to identify bounding coordinates of a plurality of tables located on the left portion of the raster image;

generate table sub-images based on the bounding coordinates of the plurality of tables;

remove, based on the bounding coordinates of the left portion and the plurality of tables, whitespace around a top and bottom of the raster image and an area having rightmost boundaries defined by the bounding coordinates of the plurality of tables to generate a first right portion sub-image;

remove approximately ¼ the right portion of the raster image from the top and the bottom to generate a second right portion sub-image; and generate a second plurality of grayscale images by converting the table sub-images and the first and second right portion sub-images to grayscale.

7. The system of claim 6, wherein the computing server system is configured to input the second plurality of grayscale images into a generative artificial intelligence model via one or more fifth API calls for extracting the document entities targeted for retrieval for the second form type.

8. The system of claim 6, wherein the computing server system is configured to:

employ an optical character recognition model to extract texts from the second right portion sub-image and identify position coordinates of each word in the texts extracted;

convert the texts extracted into lowercase texts; and input the lowercase texts and the position coordinates of each word into a rule-based system to identify a selected label in the lowercase texts.

9. The system of claim 8, wherein the computing server system is configured to:

in response to locating the selected label in the lowercase texts, crop out an area around the selected label to include a numerical value that is in a close spatial proximity to the selected label based on the position coordinates;

generate a grayscale image corresponding to the area cropped out; and input the grayscale image into a generative artificial intelligence model via a sixth API call to request an identification of the numerical value.

10. A computer-implemented method, comprising:

obtaining, by a processor of a computing device deployed within a communication network, an input in a portable document format (PDF) via a user interface element of an application program downloaded and stored on a non-transitory computer-readable storage medium of the computing device;

receiving, in a computing server system deployed within the communication network, the input from the computing device via a first application programming interface (API) call;

determining, by the computing server system, document entities to be identified and retrieved from the input in accordance with each of a plurality of form types;

analyzing, by the computing server system, each of the document entities to determine a plurality of document data identification and retrieval computational techniques;

generating, by the computing server system, a raster image of the input in accordance with a selected dot per inch (DPI);

extracting, by the computing server system, textual content represented by a list of tokens and coordinates of each token from the raster image;

encoding, by the computing server system, at least pixel-level information of the raster image, the textual content, and the coordinates of each token into another input to a machine learning/deep learning classification model via a second API call;

detecting, by the computing server system, a form type of the input based on the raster image of the input by determining the form type of the input based at least in part on probabilities generated by the machine learning/deep learning classification model, the probabilities indicating a likelihood that the input corresponds to each of the plurality of form types;

in response to detecting that the raster image of the input indicates one of the plurality of form types, partitioning, by the computing server system, the raster image into a plurality of sections corresponding to document regions containing the document entities targeted for retrieval for the one of the plurality of form types, generating sub-images based on bounding coordinates of the plurality of sections, and applying one or more of the plurality of document data identification and retrieval computational techniques to extract the document entities from the sub-images; and saving, by the computing server system, processing results of the plurality of document data identification and retrieval computational techniques in identifying and retrieval of each of the document entities in at least one database.

11. The computer-implemented method of claim 10, further comprising de-skewing the raster image of the input to correct a rotation of the raster image.

12. The computer-implemented method of claim 11, further comprising:

i) applying an optical character recognition technique to extract texts from a top left corner of the raster image;

ii) comparing the texts to a plurality of selected terms associated with the plurality of form types;

iii) upon detecting a match between the texts and at least one of the plurality of selected terms, identifying a current orientation of the raster image as a proper orientation;

iv) in response to detecting no match between the texts and at least one of the plurality of selected terms, performing a language detection of the texts and storing a confidence score of the language detection;

v) rotating the raster image by 90 degrees and repeat i), ii), iii) and iv) for 90 degrees, 180 degrees and 360 degrees;

vi) selecting an orientation corresponding to a highest confidence score if no proper orientation of the input has been identified after v); and vii) rotating the raster image in connection with the orientation corresponding to the highest confidence score.

13. The computer-implemented method of claim 10, wherein, in response to detecting that the raster image of the input indicates a first form type, the method further comprises:

partitioning, by the computing server system, the raster image into a left section, a right section, and a bottom-right section, each of the left section, the right section and the bottom-right section containing a portion of the document entities targeted for retrieval for the first form type;

identifying, by the computing server system, bounding coordinates of the left section, the right section, and the bottom-right section;

removing, by the computing server system based on the bounding coordinates of the left section, whitespace around the raster image's top and bottom and approximately 20% of the raster image from a right side to generate a left section sub-image;

removing, by the computing server system based on the bounding coordinates of the right section, whitespace around the raster image's top and bottom, and approximately 50% of the raster image from a left side to generate a right section sub-image;

removing, by the computing server system based on the bounding coordinates of the bottom-right section, whitespace around the raster image's top and bottom, approximately ⅓ of the raster image from the left side, and approximately ¾ of the raster image from the top to generate a bottom-right section sub-image; and generating, by the computing server system, a first plurality of grayscale images by converting the left section sub-image, the right section sub-image, and the bottom-right section sub-image to grayscale.

14. The computer-implemented method of claim 13, further comprising inputting, by the computing server system, the first plurality of grayscale images into a generative artificial intelligence model via one or more third API calls for extracting the document entities targeted for retrieval for the first form type.

15. The computer-implemented method of claim 10, wherein, in response to detecting that the raster image of the input indicates a second form type, the method further comprises:

partitioning, by the computing server system, the raster image into a left portion and a right portion, each of the left and right portions containing a portion of the document entities targeted for retrieval for the second form type;

identifying, by the computing server system, bounding coordinates of each of the left and right portions;

applying, by the computing server system via a fourth API call, a computer vision object detection machine learning model to identify bounding coordinates of a plurality of tables located on the left portion of the raster image;

generating, by the computing server system, table sub-images based on the bounding coordinates of the plurality of tables;

removing, by the computing server system based on the bounding coordinates of the left portion and the plurality of tables, whitespace around a top and bottom of the raster image and an area having rightmost boundaries defined by the bounding coordinates of the plurality of tables to generate a first right portion sub-image;

removing, by the computing server system, approximately ¼ the right portion of the raster image from the top and the bottom to generate a second right portion sub-image; and generating, by the computing server system, a second plurality of grayscale images by converting the table sub-images and the first and second right portion sub-images to grayscale.

16. The computer-implemented method of claim 15, further comprising inputting, by the computing server system, the second plurality of grayscale images into a generative artificial intelligence model via one or more fifth API calls for extracting the document entities targeted for retrieval for the second form type.

17. The computer-implemented method of claim 15, further comprising:

employing, by the computing server system, an optical character recognition model to extract texts from the second right portion sub-image and identify position coordinates of each word in the texts extracted;

converting, by the computing server system, the texts extracted into lowercase texts; and inputting, by the computing server system, the lowercase texts and the position coordinates of each word into a rule-based system to identify a selected label in the lowercase texts.

18. The computer-implemented method of claim 17, further comprising:

in response to locating the selected label in the lowercase texts, cropping out, by the computing server system, an area around the selected label to include a numerical value that is in a close spatial proximity to the selected label based on the position coordinates;

generating, by the computing server system, a grayscale image corresponding to the area cropped out; and inputting, by the computing server system, the grayscale image into a generative artificial intelligence model via a sixth API call to request an identification of the numerical value.

* * * * *